United States Patent

[11] 3,590,841

[72] Inventor James L. Reimers
San Jose, Calif.
[21] Appl. No 1,656
[22] Filed Jan. 9, 1970
[45] Patented July 6, 1971
[73] Assignee FMC Corporation
San Jose, Calif.

[54] COOKER CARRIERS
10 Claims, 4 Drawing Figs.
[52] U.S. Cl............................................. 134/127;
99/362, 370; 134/131; 198/140
[51] Int. Cl............................................ A23l 3/04;
F25d 1/02
[50] Field of Search................................. 99/360,
361, 362, 367, 370; 134/72, 73, 127, 130–131;
198/131, 140

[56] References Cited
UNITED STATES PATENTS

| | | | |
|---|---|---|---|
| 2,528,069 | 10/1950 | McGihon................. | 134/130XR |
| 2,667,881 | 2/1954 | Watkins et al............ | 134/131 |
| 3,347,351 | 10/1967 | Mencacci et al........... | 198/131 |
| 3,394,793 | 7/1968 | Reimers et al............ | 198/131 |
| 3,469,988 | 9/1969 | Yawger.................. | 99/362XR |

FOREIGN PATENTS

| | | | |
|---|---|---|---|
| 662,211 | 12/1951 | Great Britain | 134/131 |
| 809,650 | 2/1959 | Great Britain............. | 134/130 |

*Primary Examiner* — Robert L. Bleutge
*Attorneys* — F. W. Anderson and C. E. Tripp ABSTRACT: Carriers for a hydrostatic cooker conveyor each formed from three elongated angle bars connected together by a thin membrane tie member. Flat sides of two of the angle bars are welded to the membrane to form a wide T-shaped retaining member while the apex of the third angle bar is welded to the membrane and faces the other angle bars to define a V-shaped retaining member. Mounting plates are welded to each end of the angle bars and membrane and are attached to endless chains to define a processing conveyor. The angle bars, mounting plates, and membrane cooperate to support containers being heat treated and also serve as a trough for capturing a supply of cooling water and controlling its discharge upon containers supported in other carriers therebelow by virtue of spaced drain holes formed in the membrane.

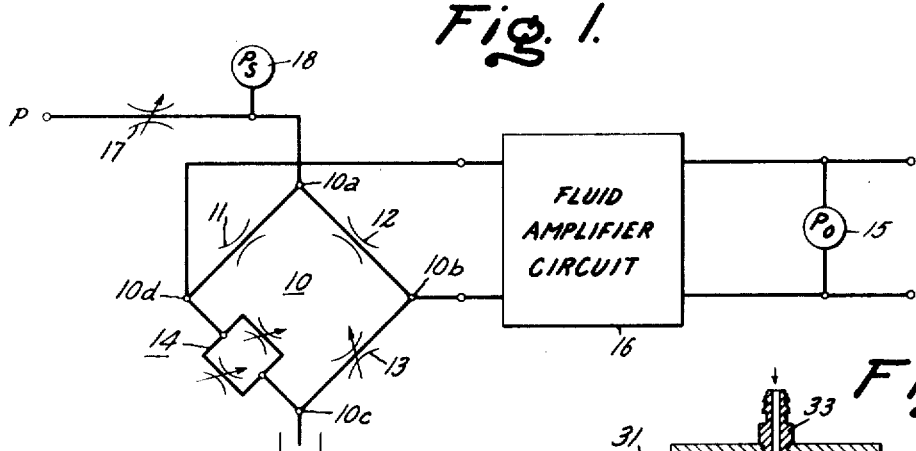

COOKER CARRIERS

BACKGROUND OF THE INVENTION

Field of the Invention

This invention relates to the cooking art and more particularly relates to improvements to carriers for hydrostatic cookers.

Description of Prior Art

The cooker carrier bars of the present invention are an improvement over those disclosed in my United States Patent No. 3,452,858 which issued on July 1, 1969. In my prior art device a T-shaped retaining flange and a V-shaped retaining flange are connected together by narrow tie members which are disposed at spaced intervals such as at two foot intervals. When the containers being processed were cans, it was determined that these tie members would contact and dent the cylindrical surfaces of the cans. It was also determined that cooling water was not effectively used by these prior art carriers since a large amount of the water that entered one carrier would not gravitate downwardly against the containers and the carriers therebelow but would be guided outwardly of these carriers by the downwardly and outwardly angled portions of the V-shaped retaining flanges.

Carriers of the type disclosed in my United States Patent No. 3,394,793 which issued on July 30, 1968 are also somewhat pertinent. This patent discloses one-piece I-beam carriers each provided with holes in its web. These carriers, however, include a flat generally horizontal can supporting surface, when the carriers are moved along a vertical path, having loosely fitted end plates thereon. Because of the loose fit of the end plates and because the containers are disposed over the holes in the flat web of the carriers thereby resisting flow of water toward the holes, the water tends to seek the lowest area in each carrier. The low area of each carrier is usually found at one of its corners. Accordingly, a considerable amount of water in the carrier flows along one of the can retaining flanges and is discharged from the carriers past the associated loosely fitted end plate. This discharged water, therefore, is not directed against the containers in carriers therebetween and its cooling potential is wasted.

SUMMARY OF THE INVENTION

The carriers of the present invention include angle bars that are connected together to define an elongated T-shaped retaining member having a thick normally horizontal flange or web and an elongated V-shaped retaining member. A membrane extends the full length of and is welded to the T-shaped member and to the apex of the V-shaped member thus allowing only the beads or chimes of cans to contact the carriers. Water retaining end plates are welded to each end of the carriers thereby making each carrier a stepped water collecting trough with the lower step or water pocket being defined between the inner edge of the thick horizontal web and the apex of the V-shaped member. The membrane is provided with a plurality of drain holes which control the discharge of cooling water downwardly from one carrier onto the containers of the next lower carrier thereby more effectively using the cooling water. The containers in each carrier also serve to restrict the drain holes thereby maintaining a supply of water in the lower portion or water pocket of each carrier for a longer period than was heretofore possible thus improving the cooling efficiency of the cooker.

BRIEF DESCRIPTION OF THE DRAWINGS

FIG. 1 is a diagrammatic vertical central section of a hydrostatic cooker through which the carriers of the present invention are moved.

FIG. 2 is an enlarged diagrammatic operational view in vertical section taken through two of the carriers when moving downwardly in the cooling zone at the point indicated by the arrow 2 in FIG. 1, the supporting conveyor chain being omitted from this view for clarity and certain of the carriers being illustrated with two different sizes of containers therein.

FIG. 3 is a section taken at a reduced scale and along lines 3–3 of FIG. 2 illustrating the manner in which the containers restrict the flow of liquid through the drain holes.

FIG. 4 is an enlarged perspective looking in the direction of arrows 4–4 of FIG. 1 illustrating several of the carriers connected to two parallel endless chains of a processing conveyor, the central portion of the carriers being cut away.

DESCRIPTION OF PREFERRED EMBODIMENT

The carriers 10 (FIGS. 2 and 3) of the present invention are adapted to handle rows of containers C, which rows are about 7 feet long. Although the containers C are illustrated as filled and sealed cans having chimes 11 (FIG. 3) around their ends, it will be understood that other types of containers, such as glass jars or capsules, may be handled in the carriers 10. The carriers 10 form a part of an endless processing conveyor 12 of a hydrostatic cooker 14 (FIG. 1).

The hydrostatic cooker 14 comprises a pair of spaced vertical walls 16 (only one being shown). A housing 18 of generally inverted U-shaped configuration is secured to the walls 16 and defines a steam chamber 19 filled with steam at a high temperature and at a superatmospheric pressure. A water filled inlet hydrostatic leg 20 is defined by walls 22, 23 and a floor 24; and a discharge or cooling hydrostatic leg 26 is defined by walls 28, 30 and a part of the floor 24. The walls 22, 23, 28 and 30 and the floor 24 are all secured in fluid tight engagement to the walls 16 and communicate therewith by virtue of a trough 32 defined in the lower portion of the cooker 14. Steam at about 250° F and 15 p.s.i.g. is directed into the steam chamber, and is balanced by a column of warm water in the inlet hydrostatic leg 20, and a column of cool water in the discharge hydrostatic leg 26.

In addition to the cooling performed by the outlet leg 26, the conveyor 12 moves the containers C through an atmospheric cooling zone 34 during which time cooling water from manifolds 36 is sprayed onto the containers C and into the carriers 10 through several series of spray headers 38 each of which includes distributing means such as troughs or nozzles 40 which are spaced apart and extend the full length of the carriers 10. A cooling housing 42 is defined by a floor 44 and walls 46, 47 and 48 which are secured to walls 16 so as to collect the cooling water and discharge or recirculate the same by means of valved conduits 50.

The conveyor 12 includes a pair of spaced chains 52 and 54 (FIG. 4) trained around a plurality of pairs of sprockets 56 (FIG. 1) keyed to shafts 58 journaled in the upper portion of the cooker 14. The chains 52 and 54 each include a series of pivotally interconnected inner links 59 (FIG. 4) and outer links 60. The chains are guided through the cooker by the sprockets 56 and guide tracks (not shown) and are continuously driven in the direction of the arrows by a motor 61 (FIG. 1) that is connected to at least one of the shafts 58 by a chain drive 62. The chains 52 and 54 are also trained around a pair of small diameter sprockets 63 at a feed station FS and discharge station DS which opens the carriers sufficiently to receive and discharge rows of containers.

A feed mechanism 64 of well known design is provided for deflecting rows of containers into the carriers at the feed station FS, and after these rows of containers have moved through the cooker and through the cooling zone 34, the processed and cooled containers are discharged onto a discharge conveyor 66 at the discharge station DS.

As illustrated in FIGS. 2 and 4, each carrier 10 includes a pair of elongated angle bars 70 having two adjacent generally horizontal flanges which cooperate to define a web 72 that has an elongated portion of a membrane 74 welded therebetween. The angle bars 70 defines a T-shaped retaining member 76 which includes a vertical container retaining side plate. The membrane 74 has a plurality of drain holes 77 therein disposed in vertical alignment with the longitudinal axes of the containers when the conveyor 12 is moving along a vertical path as indicated in FIG. 2.

The apex 78 of another angle member 80 is welded to the other elongated edge of the membrane 74 and defines a V-shaped retaining member 82. One end of the T-shaped retaining member 76, one end of the V-shaped member 82, and one end of the membrane 74 are each welded to a narrow end plate 84 which is bolted to the inner wall 86 of the associated inner link 59 of one of the chains 52 or 54. The other end of the T-shaped member 76, V-shaped member 82 and membrane 74 is welded to a wider end plate 90 which end plate is bolted to an outer wall 92 of the associated wide link 60 of the other chains 52 or 54. The T-shaped retaining member 76, V-shaped retaining member 82, apertured membrane 74 and end plates 84 and 90 cooperate to define a stepped trough 93. The trough includes a lower narrow portion or water pocket 94 disposed inwardly of the web 72 of the T-shaped retaining member 76, and a wide portion 95 which extends to the upstanding flange of the T-shaped retaining member 76 as illustrated in FIG. 2. Thus, if the supply of cooling water is low, the cooling water will be concentrated within the narrow portion 94 of the trough 93 to more effectively cool the containers. The specific construction of the endless chains 52 and 54 is identical to that disclosed in my above mentioned patent and accordingly will not be described in further detail herein.

A feature of the invention is that when cylindrical containers are being processed, the cylindrical surfaces of the containers are disposed close to the drain holes 77 and serve to restrict the flow of cooling liquid out of the carriers as indicated in FIGS. 2 and 3, thus prolonging the cooling effect on the lower portion of the containers which remain submerged in the cooling water for an appreciable period. Since the flow of water through the drain holes is restricted as above mentioned, the pressure is reduced allowing the water to spread more evenly over the small containers C or large containers C' disposed therebelow as indicated in FIGS. 2 and 3.

In operation, rows of containers C are deflected into the carriers 10 at the feed station FS. If the containers being processed are filled and sealed cans, the chimes 11 of the cans move into the carriers 10 and onto the membrane 74. Because the membrane extends the full length of the carriers, the only part of the containers C which contact the carriers 10 are the chimes 11 and, accordingly, the easily dented cylindrical body portion of the containers between the chimes are not damaged.

Also, because the membranes 74 is quite thin, being on the order of ¹⁄₁₆ of an inch in thickness, slightly larger containers such as the containers C' (FIG. 2) can be accommodated therebetween than would be possible if the carriers had a thick web.

After the rows of containers have been sterilized by being moved through the inlet hydrostatic leg 22, sterilizing chamber 19, and the cooling hydrostatic leg 26, the containers are moved into the atmospheric cooling zone 34. While in this cooling zone, water is discharged onto the containers C and into the carriers 10 as the carriers move past the nozzles 40 on each of the headers 38. As indicated in FIGS. 2 and 3, each carrier defines a stepped trough which collects the cooling water and controls the discharge of the water by directing it into the water pocket 94 and then downwardly through the hole 77 in the membrane 74 against the containers in the next lower carrier 10. The water follows the curved surface of the containers and is collected in each carrier in turn for discharge upon the containers therebelow. In this way, the cooling efficiency is greatly improved.

From the foregoing description it is apparent that by virtue of a continuous membrane which extends from one end to the other end of the elongated carriers of the present invention, the carriers preclude denting of the cylindrical surfaces of the containers. Since the membrane is quite thin, larger containers may be accommodated between the carriers than was heretofore possible. The carriers also define a stepped trough within which cooling water collects and is controllably discharged through drain holes therein onto containers therebelow for collection in these troughs thereby greatly improving the cooling efficiency of the cooker.

Although the best mode contemplated for carrying out the present invention has been herein shown and described, it will be apparent that modification and variation may be made without departing from what is regarded to be the subject matter of the invention.

What I claim is:

1. In a conveyor for a hydrostatic cooker of the type having a pair of spaced endless chains guided along a circuitous path having vertical runs moving through a heat treatment zone wherein water is directed onto the conveyor, each chain being formed by a plurality of narrow and wide links pivotally connected together, and elongated container supporting carriers connected to and extending between the chains, said carriers each comprising a normally vertical side plate retaining member on one side, a V-shaped side plate retaining member on the other side, mounting plates secured to the ends of said members, and a container supporting membrane at the horizontal mid plane of said members; the improvement wherein said container supporting membrane tightly connects to both side members and to both mounting plates, and relatively thick flange means projecting inwardly from said normally vertical side plate retaining member and stopping short of the mid plane of said membrane for cooperating with said V-shaped side plate member to form a relatively narrow water pocket, said membrane having a plurality of drain holes substantially centered between the ends of said flange means and the apex of said V-shaped side plate member for bleeding water past the walls of the containers supported on said membrane and out of said water pocket.

2. An apparatus according to claim 1 wherein said normally vertical side plate retaining members and said relatively thick flange means comprises a pair of angle bars secured to said membrane on opposite sides of said mid plane and wherein one flange of each angle bar lies in a common vertical plane when the conveyor is moving along a vertical run.

3. In a conveyor for a hydrostatic cooker of the type having a pair of spaced endless chains guided along a circuitous path having vertical runs moving through a heat treatment zone wherein water is directed onto the conveyor, each chain being formed by a plurality of narrow and wide links pivotally connected together, and elongated container supporting carriers connected to and extending between said chains; the improvement wherein said carriers each comprise means defining an elongated T-shaped retaining member including a normally horizontal web; a V-shaped retaining member having an apex which is spaced from said web; mounting plates secured to the ends of said T-shaped member and said V-shaped member and being rigidly secured to associated links on the adjacent supporting chains; each of said mounting plates being wider than the thickness of said web; and a membrane connected in liquid tight engagement to said web, apex and mounting plates whereby water directed into said carriers is collected therein; said membrane having a plurality of drain holes therein arranged to direct the collected water downwardly onto containers in carriers therebelow; said T-shaped member, said V-shaped member, said membrane and said mounting plates cooperating to define a stepped trough having a narrow step that is partially defined by the inner edge of said web and the apex of said V-shaped member.

4. An apparatus according to claim 3 wherein said T-shaped member and said web are fabricated from a portion of said membrane and from a pair of angle bars having parallel inwardly directed flanges tightly fitted on opposite sides of said portion of said membrane.

5. An apparatus according to claim 4 wherein said drain holes are substantially at the mid plane between the inner edges of said angle bar flanges and said apex to assure that water discharged therefrom will spread evenly on both sides of the containers in the carriers therebelow.

6. An apparatus according to claim 3 wherein said membrane is about 1/16 of an inch in thickness.

7. An apparatus according to claim 3 wherein the containers are cylindrical containers, and wherein the cylindrical surfaces of the containers serve to restrict the flow of water through the drain openings.

8. An apparatus according to claim 3 wherein the drain holes and the longitudinal axes of the containers supported by adjacent carriers when moving through said vertical runs lie in a common plane, wherein the containers are cylindrical cans with chimes on both ends, and wherein the space between the membrane and the lower cylindrical surface of each can serves to restrict the flow of water through the drain openings.

9. An apparatus according to claim 3 wherein the T-shaped retaining member is formed by two angle bars tightly secured to the mounting plates and to said membrane.

10. An apparatus according to claim 9 wherein the V-shaped retaining member is an angle bar having its apex welded to the membrane.

UNITED STATES PATENT OFFICE
CERTIFICATE OF CORRECTION

Patent No. 3,590,841                    Dated February 25, 1976

Inventor(s) James L. Reimers

It is certified that error appears in the above-identified patent and that said Letters Patent are hereby corrected as shown below:

On the Cover Sheet the illustrative figure should appear as shown.

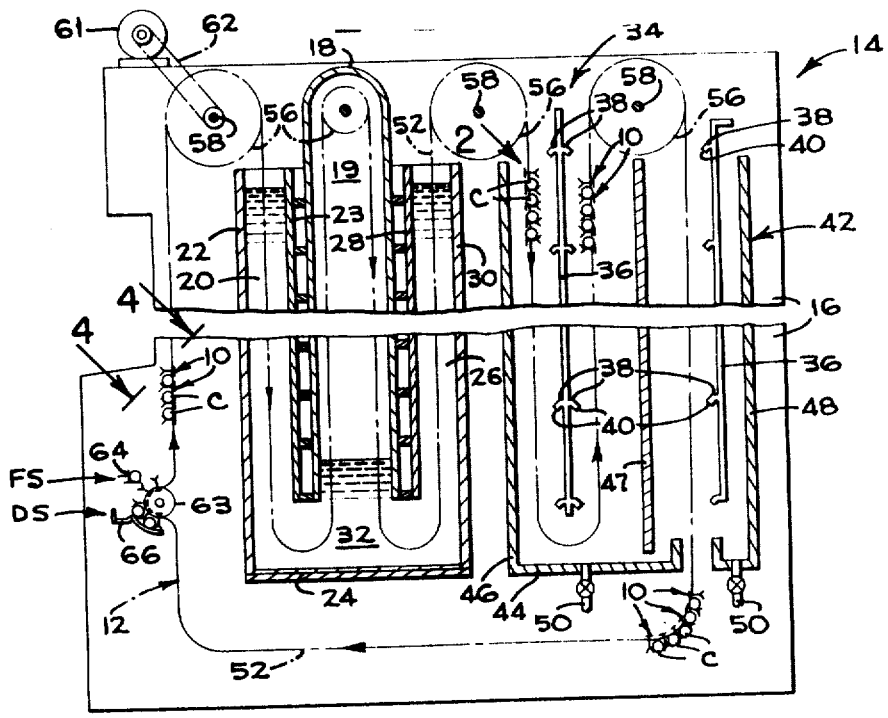

Signed and Sealed this

Fourteenth Day of September 1976

[SEAL]

Attest:

RUTH C. MASON
*Attesting Officer*

C. MARSHALL DANN
*Commissioner of Patents and Trademarks*